(12) United States Patent
Black

(10) Patent No.: US 6,634,530 B1
(45) Date of Patent: *Oct. 21, 2003

(54) MOUNTED GUN HOUSING

(76) Inventor: J. Michael Black, 808 E. Friar Tuck La., Houston, TX (US) 77024

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 634 days.

(21) Appl. No.: 09/160,814

(22) Filed: Sep. 25, 1998

(51) Int. Cl.[7] .............................. B60R 9/00; B60R 9/08
(52) U.S. Cl. ........................ 224/401; 224/420; 224/433; 224/435; 224/913; 206/317; D3/262; D12/409; D12/410
(58) Field of Search ................................. 224/400, 401, 224/421, 420, 428, 433, 435, 913, 328; 206/317; 42/90, 94, 106; D3/262; D12/409, 410

(56) References Cited

U.S. PATENT DOCUMENTS

| | | | | |
|---|---|---|---|---|
| 1,561,564 A | * | 11/1925 | Nizamis | 224/913 X |
| 3,305,147 A | * | 2/1967 | Freman | 224/913 X |
| 3,731,818 A | * | 5/1973 | Young | 206/317 |
| 3,744,687 A | * | 7/1973 | Oreck | 224/913 X |
| 3,806,010 A | * | 4/1974 | Utigard | 224/421 |
| 4,607,772 A | * | 8/1986 | Hancock | 224/913 X |
| 4,817,833 A | * | 4/1989 | Rebera | 224/421 X |
| 4,915,273 A | * | 4/1990 | Allen | 224/420 |
| 5,375,748 A | * | 12/1994 | Katz | 224/420 |
| 5,450,993 A | * | 9/1995 | Guerrero et al. | 224/246 |
| 5,573,162 A | * | 11/1996 | Spencer et al. | 224/401 |
| 5,669,495 A | * | 9/1997 | West | 206/317 |
| 5,678,686 A | * | 10/1997 | Hagemann et al. | 206/317 X |
| 5,697,181 A | * | 12/1997 | Savant | 224/420 X |
| 5,706,990 A | * | 1/1998 | Lahrson | 224/401 X |

FOREIGN PATENT DOCUMENTS

GB 18657 * 10/1907 .................. 224/913

* cited by examiner

Primary Examiner—Gregory M. Vidovich
(74) Attorney, Agent, or Firm—Fulbright & Jaworski L.L.P.

(57) ABSTRACT

The present invention for a mounted gun case, for an ATV and the like, comprises a protective gun housing with an opening on the top through which a gun may pass. The protective gun housing is connected to a mounting assembly designed to attach to handle bars.

4 Claims, 4 Drawing Sheets

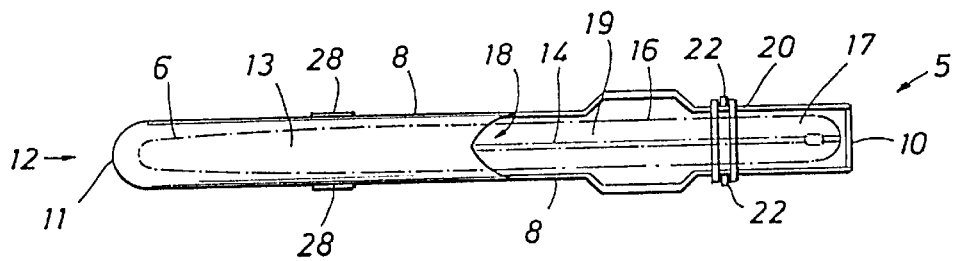
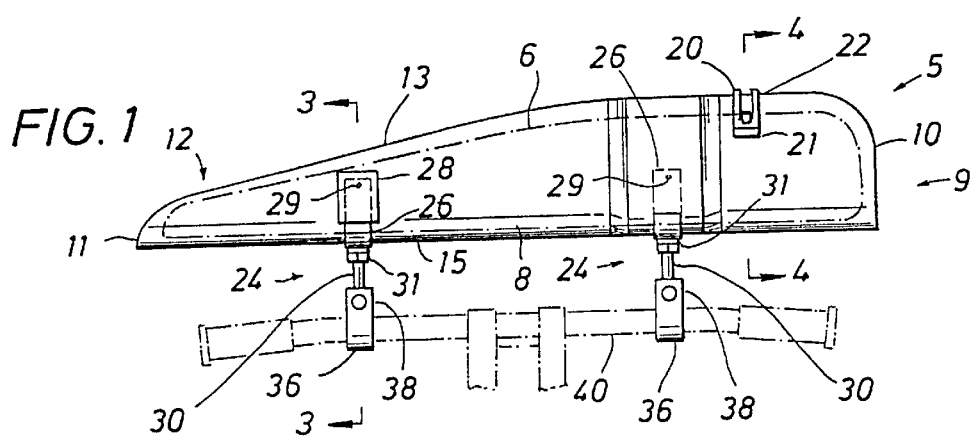
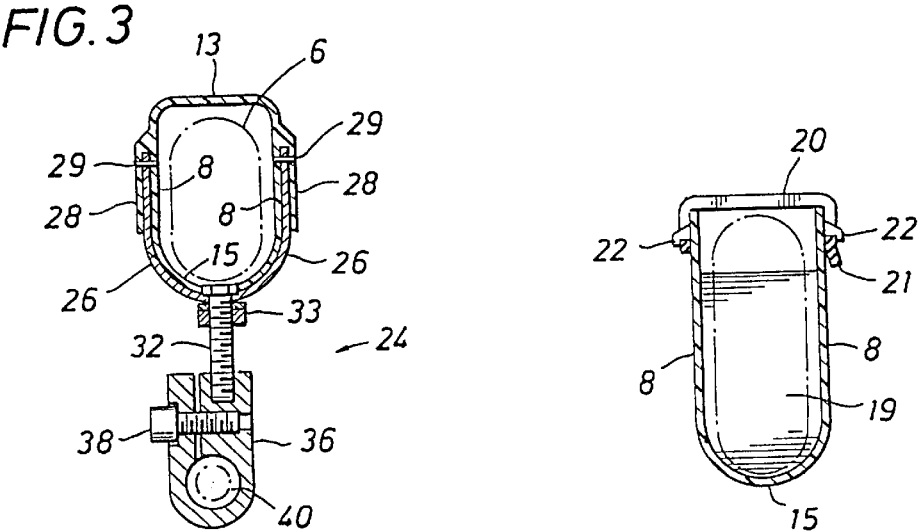
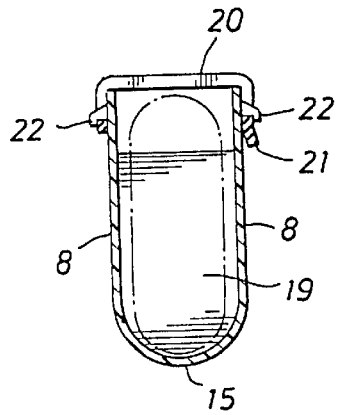

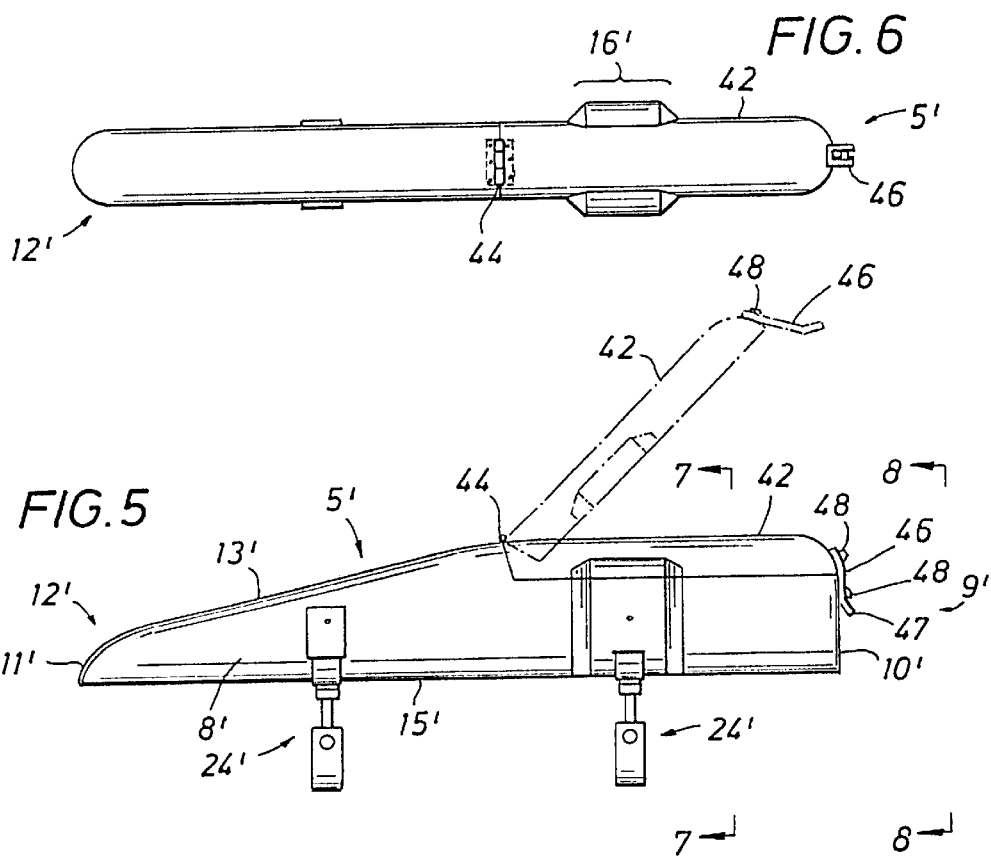
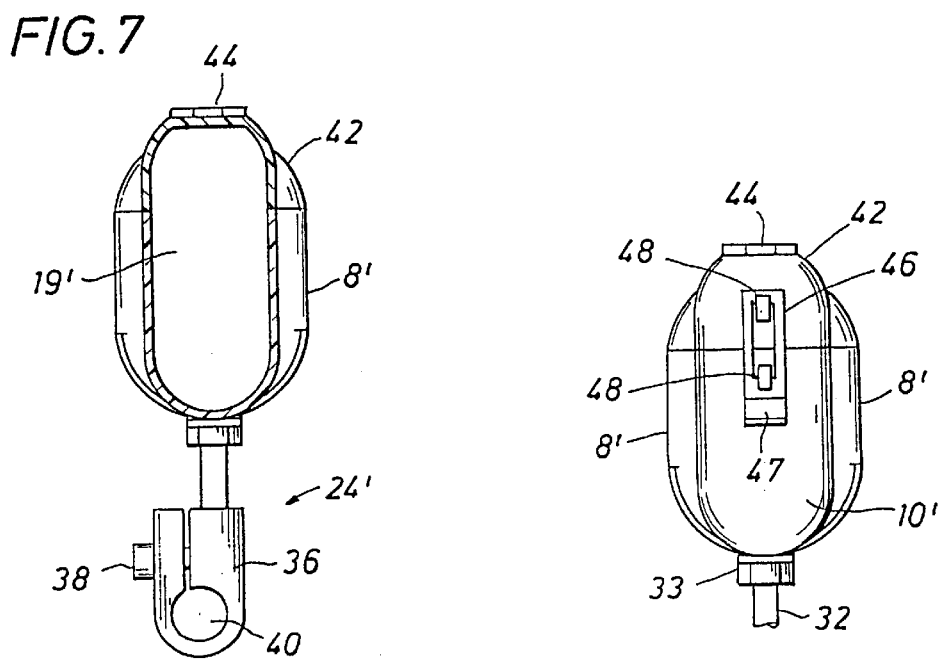

MOUNTED GUN HOUSING

FIELD OF INVENTION

The present invention relates to a new and improved gun case for mounting onto handle bars of recreational vehicles and the like.

BACKGROUND OF THE INVENTION

Hunting from all terrain vehicles (ATV) and other recreational vehicles has grown in popularity over the last several years. A major concern for ATV hunters is where to store their hunting rifles. The guns are traditionally stored in holding forks attached to the handle bars of the ATV so that the gun extends between the forks above and generally parallel to the handle bars. The gun is held in place with elastic fasteners stretched across the top of the forks. However, the gun will often rotate in the holding forks and result in the scope slamming against the handle bars of the ATV, thereby damaging or misaligning the scope. In addition, the gun and scope are exposed to the elements and debris while in the open holding forks. Rain, dust, mud, dirt or debris or rain can easily penetrate and damage or accelerate the wear of the rifle and scope.

Instead of exposing their hunting rifles and scopes to potential damage, many hunters store their guns in hard plastic cases attached to the side or rear of the ATV. These cases completely enclose and protect the guns, but do not allow for easy accessibility to the gun while riding the ATV.

Therefore, what is needed is a new mounted gun case which will allow for easy accessibility for a ATV hunter while still protecting the gun and/or scope from damage.

SUMMARY

The present invention is directed to an apparatus that satisfies the need to properly secure and store guns to an ATV with easy accessibility. A mounted gun case having features of the present invention comprises a protective gun housing and a mounting assembly designed to attach to handlebars. An embodiment of the present invention has a protective gun housing with a bottom portion and attached to it a first side wall, a second side wall, a butt end and an barrel end. The first and second side walls, the butt end and the barrel end define an opening at the top of the gun case through which a gun may pass.

Another embodiment having features of the present invention include a gun housing having a fastener attached to one of the side walls and engagably attached to the other side wall of the gun housing.

Another embodiment having features of the present invention includes a gun housing with a top portion hingedly attached to one of the side walls of the gun housing at the top opening where the gun may pass through.

Another embodiment having features of the present invention includes a gun rest attached to the mounted gun housing.

An object of the present invention is to provide a place to securely store hunting guns on an ATV.

Another object of this invention is to provide a place to store hunting guns on an ATV so that the gun and scope are secure and protected from being accidentally hit or exposed to excessive dirt or elements.

Another object of the present invention is to provide a place to store a hunting gun on an ATV so it is easily accessibility to the rider of the ATV.

These and other features, aspects and advantages of the present invention will become better understood with reference to the following description, drawings and appended claims.

BRIEF DESCRIPTION OF THE DRAWINGS

FIG. 1 presents a side view of an embodiment of the present invention.

FIG. 2 presents a top view of the embodiment of the present invention depicted in FIG. 1.

FIG. 3 presents a cross-sectional view of an embodiment of the present invention depicted in FIG. 1 at a mounting bracket.

FIG. 4 presents a cross-sectional view of an embodiment of the present invention depicted in FIG. 1 at the top opening.

FIG. 5 presents a side view of an embodiment of the present invention.

FIG. 6 presents a top view of an embodiment of the present invention depicted in FIG. 5.

FIG. 7 presents a cross-sectional view of the embodiment of the present invention depicted in FIG. 5 at the butt end.

FIG. 8 presents a rear view of the embodiment of the present invention depicted in FIG. 5.

DETAILED DESCRIPTION OF THE INVENTION

Figure 10:
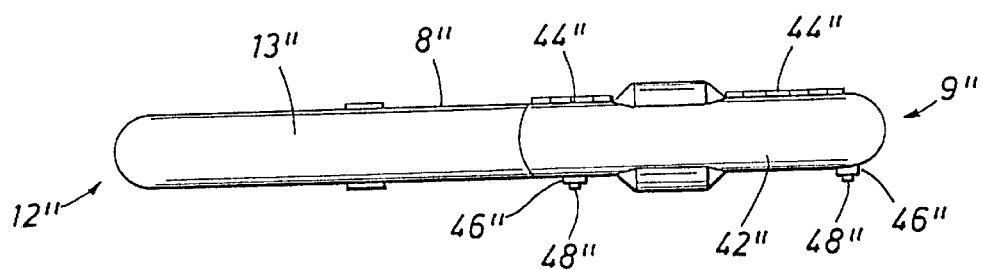
FIG. 10 presents a top view of the embodiment of the present invention depicted in FIG. 9.

The mounted gun housing of the current invention is intended to be used primarily with all terrain vehicles (ATVs), but may be used on the handlebars or other area of attachment on any vehicle. An embodiment of the present invention consists generally of three portions: a protective gun housing, a soft gun case and a mounting system. The protective gun housing or case is generally made of a stiff or semi-stiff plastic and shaped to receive a gun such as a hunting rifle or shotgun. The protective case has an opening at the top of the case through which the gun and soft case are inserted and removed. The hard case is mounted above and generally parallel to the handlebars of the ATV. The gun and its accompanying protective soft case are stored inside the protective hard case once it is mounted. The gun is easily accessible through the top opening, but may be secured within the case by various different means.

FIGS. 1 through 4 illustrate various views of an embodiment of the present invention. Generally, gun housing 5 is attached to handlebars 40 with mounting assemblies 24. Gun housing 5 consists of bottom portion 15, side walls 8, butt wall 10, barrel front wall 11 and barrel top wall 13. Barrel front wall 11 and barrel top wall 13 may be generally referred to as the barrel end 12. Gun housing 5 of FIG. 1 is designed to roughly outline the shape of a hunting rifle with an attached scope. As such, barrel end 12 is tapered to fit more snugly around the portion of soft case 6 that holds the barrel of the gun. Butt end 9 of gun housing 5 is taller to accommodate the butt end of a gun with an attached scope. Top opening 14 of gun housing 5 is formed by side walls 8, butt wall 10 and barrel top wall 13. Side walls 8 are deformed outwardly at action area 16 to create a greater distance between side walls 8 of the interior 19 of gun housing 5. The deformation of side walls 8 also creates a larger opening at action area 16 of top opening 14. The increased width at action area 16 in the interior 19 and at the top opening 14 allows for a hand gripped around the action area of a hunting rifle to easily slide in and out of gun housing 5. A hunting rifle or a hunting rifle in its soft case 6 is inserted into and removed from gun housing 5 through opening 14. The larger opening as shown in the figures extends horizontally from the base to the top of side walls 8. The larger opening may also extend diagonally from the base toward the butt end of the top portion of side walls; in this fashion, the larger opening naturally fits the movement of a hand inserting the gun and soft case into the gun housing 5.

An elastic fastener may be used to more tightly enclose the soft case and gun within the hard case. Elastic fastener 20 is stretched across top opening 14 between two prongs 22 attached to each of the side walls 8. When secured, fastener 20 prevents soft case 6 from being jarred out of gun housing 5. Fastener 20 may be easily removed by gripping grasp 21 and removing fastener 20 from prong 22.

Mounting assemblies 24 consist primarily of a bracket to hold gun housing 5 and a mount to attach to handlebar 40. As seen in FIG. 3, support members 26 extend along the outside of sidewalls 8. Support member 26 is basically U-shaped and attached to gun housing 5 with pin 29 inserted through outer member 28, support member 26 and side wall 8. Support member 26 may be attached to gun housing 5 in any way known to a person of ordinary skill in the art within the scope of the invention, including screws, bolts, welding and glues. Gun housing 5 is also attached to support member 26 with bolt 32 and nut 33 on the bottom portion of gun housing 5. Bolt 32 also serves to attach support member 26 and gun housing 5 to mounting collar 36. Mounting collar 36 is designed to fit around handlebars 40 and be secured in place with collar bolt 38.

Figure 9:
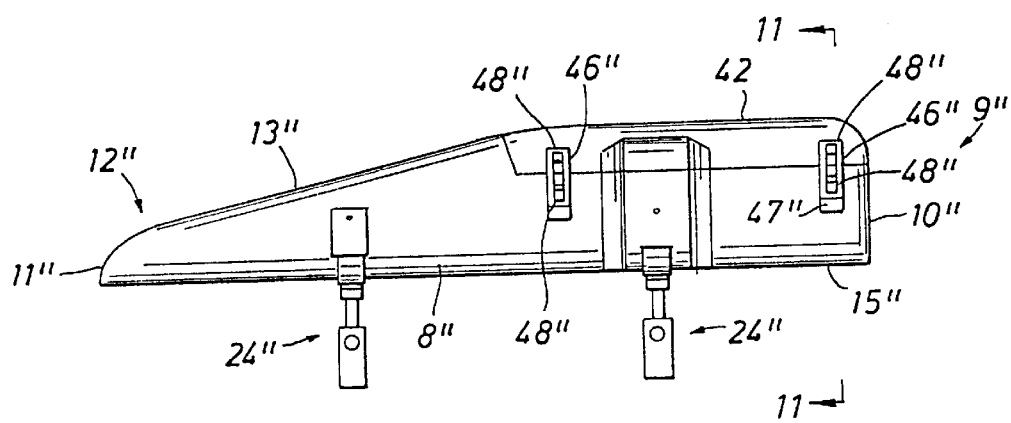
FIG. 9 presents a side view of an embodiment of the present invention.
Figure 11:
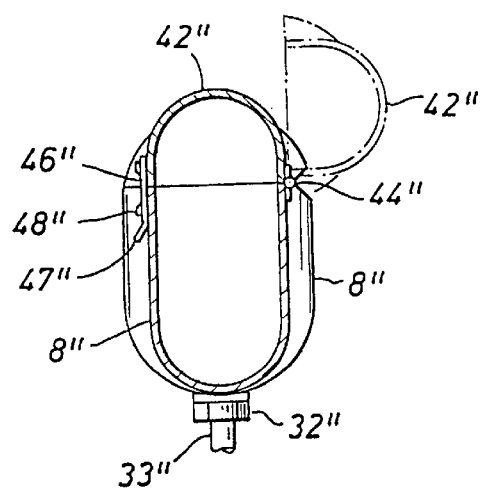
FIG. 11 presents a cross-sectional view of the embodiment of the present invention depicted in FIG. 9 at the butt end.

FIGS. 5 through 8 illustrate another embodiment of the present invention. In this embodiment, top opening 14 is covered with top cover 42 so as to completely enclose a gun. Top cover 42 is attached to gun housing 5' through hinge 44 attached to the barrel top wall 13'. Top cover 42 is secured shut with fastener 46 which attaches to prongs 48 on the top cover 42 and on the butt wall 10'. FIGS. 9 through 11 show another embodiment of the present invention with top cover 42', except that cover 42' is attached to gun housing 5' through hinges 44' attached to side wall 8'. In this manner, top cover 42' would open away from the driver of an ATV and allow for easy access to a stored gun. In addition to the embodiments shown here, top cover 42 may be attached to gun housing 5' in any way known to a person of ordinary skill in the art while staying within the scope of the invention.

The gun housing 5 of an embodiment of the present invention is made out of any stiff, semi-stiff or hard material such as plastic, metal or wood. The hard housing is intended to protect the gun from being nicked or banged by foreign objects when driving an ATV. In addition, the gun housing 5 is intended to protect the gun and scope from mud, dirt and water splashed up by an ATV while riding. The gun may be better protected if it is completely enclosed by gun housing 5, however, by leaving an opening at the top of the gun housing, adequate protection is provided while still allowing easy access to the gun. Material used for gun housing 5 should be easy to clean as it will likely get dirty as it protects the gun from the elements.

The shape of gun housing 5 may vary and still stay within the scope of the invention. For example, gun housing 5 may be shaped as a rectangle similar to the design of many carrying cases for hunting rifles. The rectangular case may be attached to the handlebars go that the flat portion of the case runs parallel to the ground. A firearm with scope when stored in the rectangular case would ride flat on its side rather than with the underside of the rifle riding on the bottom of the gun housing. The rectangular case would open by unlatching and lifting the top side of the case.

The top cover 42 may be made of various different material. For example, the top cover may be made of the same material as the rest of the gun housing, but this is not required. The top covering could be made of a waterproof cloth-like material that stretches across the top opening of the gun housing to protect the stored firearm.

The gun housing may be attached to the mounting assembly in various different ways obvious to a person of ordinary skill in the art. For example, instead of attaching the gun housing 5 to a bracket-like support member 26, the barrel end 12 of gun housing 5 could be inserted through a ring which is bolted to the mounting collar 36. Other similar methods of attaching gun housing 5 to mounting assemblies 24 will be obvious to a person of ordinary skill in the art.

In another embodiment of the present invention, gun housing 5 is tilted toward the rider of an ATV. In FIGS. 1 through 4, gun housing 5 is positioned at a 90° angle with respect to handlebars 40. By tilting gun housing 5 with respect to handlebars 40 so that the top opening 14 of gun housing 5 directly faces a rider on an ATV, the gun inside gun housing 5 is even more accessible. For example, gun housing 5 may be mounted on handlebars 40 so that the gun housing 5 is at a 70° angle with respect to the ground. At such a tilt, the opening 14 of gun housing 5 will directly face the driver of an ATV and allow for quicker access to the stored gun. When mounting the gun housing at a tilt, care should be taken so that the case does not ride at an angle which would allow the gun to slide out of the case unintentionally. Instead of tilting the gun housing, the opening in the gun housing may be moved to a different position on the gun housing to allow for easy accessibility to an ATV rider.

The mounting assembly used for the present invention may comprise of any means known to a person of ordinary skill in the art without escaping the scope of the invention. The mounting assembly shown in FIGS. 1–13 are meant for illustrative purposes only and do not restrict the scope of the invention.

Another embodiment of the present invention uses V-shaped brackets instead of the U-shaped brackets for support members 26. The V-shaped bracket is inserted through slots in the bottom portion of the gun housing so that the bracket will create outward tension on the interior of the sidewalls of the gun housing. At the top end of the V-shaped bracket, the bracket is bent to fit into a slit in the gun housing that prevents the gun housing from moving with respect to the V-shaped brackets. Other manners to attach the brackets to the gun housing will be easily recognizable to a person of ordinary skill in the art and while staying within the scope of invention.

Figure 12:
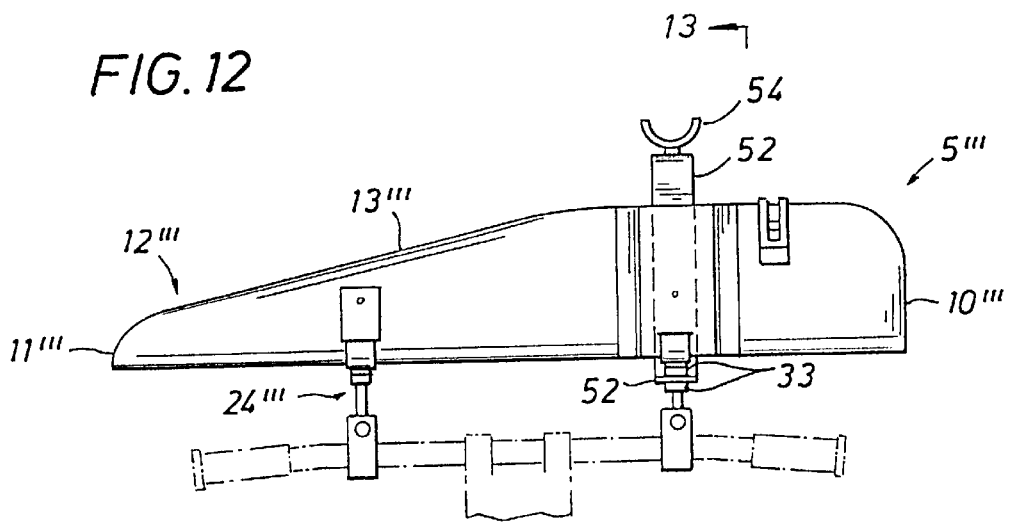
FIG. 12 presents a side view of an embodiment of the present invention.
Figure 13:
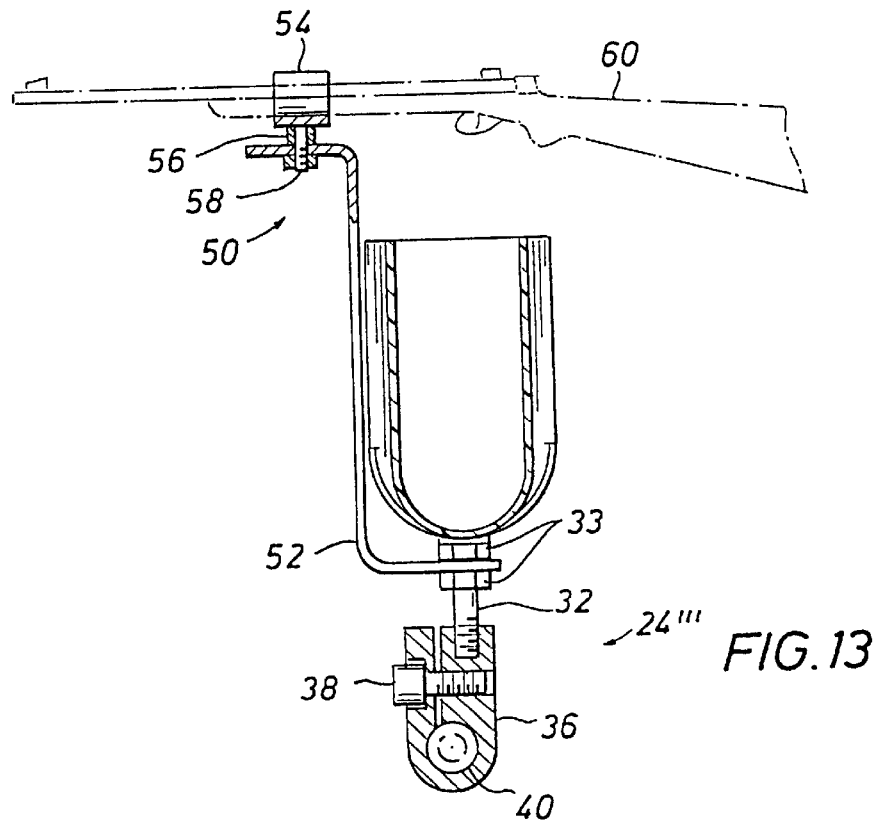
FIG. 13 presents a cross-sectional view of the embodiment of the present invention depicted in FIG. 12 with a mounted hunting gun.

As an additional option to the mounted gun housing, a gun rest may be attached as seen in FIGS. 12 and 13. Gun support assembly 50 consists of support member 52 attached to bolt 32 with nuts 33 at one end and attached to gun cradle 54 with cradle mount 56 at the other end. Gun cradle 54 is curved on top so that rifle 60 will sit comfortably in it. Gun support assembly 50 allows an ATV hunter to remove the gun from gun housing 5 and rest the barrel end of the gun 60 on gun cradle 54 to steady the gun for aiming and firing. Gun mounting assembly may be attached to the mounted gun housing in any reasonable manner without escaping the scope of the invention.

The description and diagrams of embodiments of the present invention are intended to promote an understanding of the invention and are not intended to limit the scope of the claimed invention. Further modifications, alterations or applications of the illustrated apparatus may fall within the scope of the invention.

I claim:

1. An apparatus, comprising:

a protective gun housing having a bottom portion, first and second side walls each disposed generally parallel to each other and attached to the bottom portion, a butt end attached to the bottom portion and the first and second side walls, a barrel end attached to the bottom portion and the first and second side walls, the barrel end having a barrel front wall and a barrel top wall, the first and second walls, the butt end and the barrel top wall defining an opening for receiving a gun, the opening having a portion of the first and second side walls spaced distally further apart from each other than the first and second side walls at the butt end and barrel end; and a mounting assembly attached to said gun housing and designed to attach to handle bars.

2. The apparatus of claim 1, further comprising a fastener attached to the first side wall and removably attached to the second side wall of the gun housing.

3. The apparatus of claim 1, further comprising a top portion hingedly attached to the first side wall at the opening for receiving a gun.

4. The apparatus of claim 1, further comprising a gun rest attached to the mounting assembly, the protective gun housing, or the mounting assembly and the protective gun housing.

* * * * *